(12) United States Patent
Narmo

(10) Patent No.: US 8,579,542 B2
(45) Date of Patent: Nov. 12, 2013

(54) VEHICLE ARRESTING BED

(75) Inventor: Jon A. Narmo, Hamar (NO)

(73) Assignee: Norsk Glassgjenvinning AS, Oslo (NO)

(*) Notice: Subject to any disclaimer, the term of this patent is extended or adjusted under 35 U.S.C. 154(b) by 42 days.

(21) Appl. No.: 13/142,985

(22) PCT Filed: Jan. 13, 2011

(86) PCT No.: PCT/NO2011/000015
§ 371 (c)(1),
(2), (4) Date: Nov. 21, 2011

(87) PCT Pub. No.: WO2011/087375
PCT Pub. Date: Jul. 21, 2011

(65) Prior Publication Data
US 2012/0057931 A1    Mar. 8, 2012

Related U.S. Application Data

(60) Provisional application No. 61/294,504, filed on Jan. 13, 2010.

(30) Foreign Application Priority Data

Jan. 13, 2010  (GB) .................................. 1000544.5

(51) Int. Cl.
E01C 11/00    (2006.01)
(52) U.S. Cl.
USPC ...... 404/71; 244/110 R; 244/114 R; 188/376; 188/377
(58) Field of Classification Search
USPC ............... 188/371, 376, 377; 404/17, 27, 71; 244/110 R, 114 R
See application file for complete search history.

(56) References Cited

U.S. PATENT DOCUMENTS

| | | | | |
|---|---|---|---|---|
| 3,066,896 A | * | 12/1962 | Schirtzinger | 244/114 R |
| 3,967,704 A | | 7/1976 | Ogden | |
| 4,836,856 A | | 6/1989 | Klco | |
| 5,193,764 A | | 3/1993 | Larratt et al. | |
| 5,885,025 A | * | 3/1999 | Angley et al. | 404/27 |
| 5,902,068 A | * | 5/1999 | Angley et al. | 404/34 |
| 6,726,400 B1 | | 4/2004 | Angley et al. | |
| 7,695,560 B1 | * | 4/2010 | Buarque de Macedo | 106/716 |
| 7,837,409 B2 | * | 11/2010 | Mahal et al. | 404/6 |
| 8,021,075 B2 | * | 9/2011 | Valentini et al. | 404/39 |

(Continued)

FOREIGN PATENT DOCUMENTS

GB    1169415 A    11/1969

OTHER PUBLICATIONS

M. Barsotti, "Developing Improved Civil Aircraft Arresting Systems," ACRP Project 07-03, ACI-North America Conference, Denver, CO, May 6, 2008, 22 pages.

(Continued)

Primary Examiner — Gary Hartmann
(74) Attorney, Agent, or Firm — Osha Liang LLP

(57) ABSTRACT

Arresting beds for decelerating vehicles, especially passenger air-crafts unable to stop on available run-way, including a vehicle arresting system. The vehicle arresting system also includes a bed filled with foamed glass aggregate with particle sizes ranging from 0.25 cm to 15 cm and nominal void fractions from about 70 to 98%, and a top cover covering the upper surface of the bed of foamed glass aggregate.

13 Claims, 6 Drawing Sheets

(56) References Cited

U.S. PATENT DOCUMENTS

| | | | |
|---|---|---|---|
| 8,021,174 B1* | 9/2011 | Schutte | 439/144 |
| 2008/0247819 A1 | 10/2008 | Valentini et al. | |
| 2009/0016817 A1* | 1/2009 | Kulhawe et al. | 404/17 |
| 2013/0020437 A1* | 1/2013 | Valentini et al. | 244/110 R |

OTHER PUBLICATIONS

M. Barsotti, "Developing Improved Civil Aircraft Arresting Systems," ACRP Report 29, Washington, D.C., Jan. 21, 2010, 207 pages.
International Search Report issued in PCT/NO2011/000015, mailed on May 20, 2011, 5 pages.
Written Opinion issued in PCT/NO2011/000015, mailed on May 20, 2011, 5 pages.
Search Report issued by the Intellectual Property Office of Great Britain in Application No. GB1000544.5, dated Mar. 9, 2010, 1 page.
R.F. Cook, "Evaluation of a Foam Arrestor Bed for Aircraft Safety Overrun Areas", University of Dayton Research Institute, Jan. 1988, UDR-TR-88-07, 270 pages.
R.F. Cook, "Soft-Ground Aircraft Arresting Systems: Final Report," Washington DC, Federal Aviation Administration, Aug. 1987, FAA/PM-87-27, 150 pages.
J.C. White et al., "Soft Ground Arresting System for Airports: Final Report", Washington DC, Federal Aviation Administration, Dec. 1993, CT-93-80, 76 pages.

\* cited by examiner

VEHICLE ARRESTING BED

This invention relates to arresting beds to decelerate vehicles, such as i.e. aircrafts unable to stop on available run-way.

BACKGROUND

One safety-problem in aviation is that aircrafts during take-off or landing occasionally overruns the available run-way and ends up in the terrain behind the run-way. There are several examples of such accidents with catastrophic results both in terms of material damage and loss of lives/seriously damaged health of persons involved.

It is identified a range of possible causes for such accidents, such as late discovery of mechanical failures of the aircraft making it necessary to abort the take-off, aircraft break failures, unexpected weather incidents, pilot errors etc. The wide variety of causes behind overruns makes it unlikely that it will be possible to introduce measures to entirely avoid these situations in aviation.

Thus, to alleviate and avoid the severe consequences of overrun situations, it is necessary to provide run-ways with means for capturing and/or slowing down aircrafts overrunning the run-way in a safe manner. For air-fields with plenty available space behind the run-way, one obvious answer is simply to prolong the run-way to allow the aircrafts ample space to stop by use of their brakes or reverse engine power.

However, many air-fields do not have available space to make a sufficient prolongation of the run-way, and there are also incidents where an overrun is caused by malfunction of the aircrafts braking systems. It is therefore advantageous to provide airfields with one or more means for exerting an external deceleration force on aircrafts overrunning the end of the run-way, and which is able to force the aircraft to stop at a deceleration rate which is tolerable for the mechanic construction of the aircraft, especially the landing gear, and the persons onboard the aircraft.

PRIOR ART

One known solution for bringing aircrafts (or other wheeled vehicles) to stop is to provide an arrestor zone. An arrestor zone is a zone made of a shallow bed of a relatively soft material on-top of a hard material able to carry the wheels of the vehicle. When a vehicle enters the arrestor zone, its wheels will sink somewhat into the soft material and thus obtain a significant increase in drag load. The soft mass of the arrestor zone thus absorbs the kinetic energy of the vehicle and brings it to a safe stop. Arrestor zones are attractive for use in airfields due to being passive in nature and having no moving parts such that they are always ready for use.

One example of arrestor zones is disclosed in U.S. Pat. No. 3,066,896, where the arrestor consists of a liquid filled shallow basin of length about 300 m placed at the end of the run-way, and which is covered with a strong but flexible top-cover. The liquid filled basin with the top-cover will form a soft zone at the end of the run-way which will be depressed by the wheels of an aircraft driving on the top-cover. Due the need for pushing away the underlying liquid as the wheels rolls over top-cover, the depressed zone creates a sizeable increase in the rolling resistance of the wheels and thus functions as an arresting zone that induces a decelerating force on the aircraft.

U.S. Pat. No. 3,967,704 discloses use of a crushable material as arrestor bed adjacent to a vehicle track. A vehicle driving out of its track will enter a zone with a layer of this crushable material; the wheels of the vehicle will penetrate into the crushable material and thus induce a significant rolling resistance which decelerates the vehicle. The crushable material is a cured foam with compressive strength ranging from about 100 to 350 kPa (15 to 50 psi), which is calculated to provide a retardation of an aircraft in the order or 0.7-0.9 g. Urea/formaldehyde resins are mentioned as suitable curable foams.

U.S. Pat. No. 5,193,764 discloses an arrestor bed made of rigid, friable, fire resistant foam boards connected to form a panel. The foam boards should preferably be made from phenolic foam, have a thickness in the range from 2.5 to 15.2 cm and a compressive strength in the range from 137 to 552 kPa (20 to 80 psi).

The Federal Aviation Administration of the USA has investigated the use of different materials to make arrestor zones for aircrafts. In studies by Robert Cook et al., "Soft Ground Aircraft Arrestor Systems: Final Report", Washington D.C., Federal Aviation Administration, 1987, FAA/PM-87-27, and "Evaluation of a Foam Arrestor Bed for Aircraft Safety Overrun Areas", Dayton: University of Dayton Research Institute, 1988, UDR-TR-88-07, it is discussed the need for having soft materials with reliable and consistent mechanical behaviour with changing climate conditions. The mechanical behaviour of soft materials such as clay or sand depends on moisture content, i.e. dry clay is hard and provides little drag effect, while wet clay is so soft that the wheels may sink to low and obtain a drag which collapses the landing gear. Shallow water basins are found to function satisfactory as arrestor beds for aircraft at velocities of 90 km/h (50 knots) or less, but will attract birds and will also have problems with freezing in cold climates. Another possible problem with arrestor beds is that the wheels of the aircrafts may create a burst of particulate material which may be ingested by the aircrafts engines when the aircraft passes at high velocity over the arrestor bed. The reports by Cook et al. also investigated the suitability of various foam arrestor materials, and found that in this regard, cementitious foams had advantages over polymer foams.

Further investigations made by White and Agrawal, "Soft Ground Arresting Systems for Airports: Final Report", Washington D.C., Federal Aviation Administration, 1993, CT-93-80, it was found that crushable materials such as phenolic foam and cellular cement have advantages in providing predictable drag load imparted on the landing gear and constant mechanical properties over a broad temperature range. Cellular cement became the material of choice due to it's near-zero rebound after crushing and chemically inert composition.

U.S. Pat. No. 6,726,400 discloses an arrestor bed of cellular concrete having length, width, and thickness including first and second lateral rows of blocks of compressible cellular concrete, each block having a compressive gradient strength (CGS) characteristic representing a selected gradient of compressive strength with depth, over a depth of penetration from at least 10 to 60 percent of block thickness, the compressive gradient strength characteristic selected to provide gradual deceleration of a vehicle entering said bed. The concrete blocks are described to have a dry density in the range of 192 to 352 kg/m³. The first row of blocks should have a 60/80 CGS characteristic nominally equal to 482.6 MPa (70 psi), and the second row of blocks should have a 80/100 CGS characteristic nominally equal to 620.5 MPa (90 psi), when averaged over said depth of penetration of said respective blocks.

A study by Stehly, "Report of Concrete Testing, Project: Engineered Material Arresting System Minneapolis/St. Paul Airport", American Engineering Testing Inc, 2007, 05-03306, found that the performance of the concrete based arrestor has been degraded after installation in 1999.

OBJECTIVE OF THE INVENTION

The main objective of the invention is to provide an arrestor system able to safely decelerate vehicles.

A further objective of the invention is to provide an arrestor system with superior multi-aircraft performance.

DESCRIPTION OF THE INVENTION

The invention is based on the realisation that rough broken foam aggregate made of glass may be used for forming low investment-cost and low maintenance-cost arrestor beds for arresting vehicles, and on the discovery that foamed glass aggregates exhibit an exponential increase in energy absorption with increased compression rate. The latter discovery provides an advantage in that the compression rate of the material in an arrestor bed is a function of the penetration depth of the wheels of the vehicle being arrested, such that the exponential increase in energy absorption with increased wheel penetration depths make foamed glass aggregate very suited for use as multi-purpose arrestor beds intended for use on vehicles of huge variations in weight.

The term "glass" as used herein means an amorphous solid usually termed soda-lime glass or soda-glass, but may also include other types of glass such as borosilicate glass. Soda-lime glass is typically made by melting raw materials including one or more of sodium carbonate (soda), limestone, dolomite, silicon dioxide, aluminium oxide, and small quantities of additives. Borosilicate glasses are made by melting boron oxide, silicon dioxide, and small quantities of additives. The term "foamed glass aggregate" as used herein means a glass that is melted, aerated, solidified, and then crushed to particles with sizes ranging from 0.25 cm to 15 cm (~0.1 to 5.9 inches). The aerated glass may have nominal void fractions from about 70 to 98%.

Thus in a first aspect, the present invention relates to a vehicle arresting system, wherein the system comprises:
- a vehicle arresting area comprising a bed filled with foamed glass aggregate with particle sizes ranging from 0.25 cm to 15 cm and nominal void fractions from about 70 to 98%, and
- a top cover covering the upper surface of the bed of foamed glass aggregate.

In a second aspect, the present invention relates to a method for arresting vehicles, wherein the method comprises
- making a bed in the ground where the vehicles are to be arrested,
- filling the bed with foamed glass aggregate with particle sizes ranging from 0.25 cm to 15 cm and nominal void fractions from about 70 to 98%, and
- covering the upper surface of the bed with a top cover.

In a third aspect, the present invention relates to use of foamed glass aggregate in vehicle arresting systems.

In a fourth aspect, the present invention relates to use of foamed glass aggregate with particle sizes ranging from 0.25 cm to 15 cm and nominal void fractions from about 70 to 98% in vehicle arresting systems.

The term "vehicle" as used herein means any automotive mechanical structure which moves on land by use of wheels and/or belts. The term also includes aircrafts moving on ground/airports. It may also include non-automotive vehicles such as bicycles.

The term "top cover" as used herein means any cover of the aggregate mass which will prevent the aggregate mass to be contaminated or filled with air-borne particulates, subject to plant growth, or other environmental impacts which interferes with the performance of the foamed glass aggregate mass. The top cover should be sufficiently mechanically strong to keep the bulk part of the aggregate mass clean, but not so strong that it prevents the wheels of a vehicle to be arrested from penetrating through the cover and enter the aggregate mass. Examples of suited top covers are polymeric tarpaulins, plastic foils, artificial turf, etc. However, any cover able to protect the aggregate mass but unable to carry the vehicle's wheels may be employed. The top cover may advantageously be given a decorative function by applying materials with an aesthetic appeal or which appears in harmony with the environment. An artificial turf mimicking with appearance of a grass lawn may be an example of an aesthetic top cover.

The term "nominal void fraction" as used herein includes void fractions which arise from the micro-structural pores of the foam glass and the voids between aggregate pieces—the overall nominal void fraction is thus to bee understood as the net effect of these two fractions taken together. The nominal void fraction thus corresponds to the overall density of the foamed glass aggregate. In case of i.e. employing silicate glass, which has a density at zero nominal void fraction of about 2500 kg/m$^3$, a nominal void fraction of 98% will thus mean that 1 m$^3$ of foamed glass aggregate will weigh about 50 kg, while a nominal void fraction of 70% corresponds to a weight of about 750 kg per m$^3$.

The term "bed" as used herein is to be understood as a generic term covering any form of depression/cavity formed in the ground. The depression/cavity may simply be formed by removing mass/earthworks volume and then fill the depression/cavity with foamed glass aggregate to form a bed of aggregate of which the upper surface plane is aligned with the surface plane of the surrounding ground. Alternatively the bed of foamed glass aggregate may be kept in place by use of berms or another form of mechanical structure, i.e. walls, around the perimeter of the bed in cases where a stronger mechanical resilience is needed. The bed may also be laid on the ground, either without forming a depression/cavity or alternatively by forming a narrow depression/cavity such that the bed of foamed glass aggregate will protrude a distance above the ground surface level. In these cases the aggregate mass needs to be contained by use of berms or another form of mechanical structure along the perimeter of the bed. If the berms/mechanical structure protrudes a distance above the ground level, the latter embodiment may need means for making the vehicle enter the aggregate bed in a smooth manner, such as i.e. a ramp etc. leading into the bed. The bottom of the bed may be provided by i.e. floor in the depression/cavity to mechanically reinforce the bottom of the bed when needed.

The dimensions and location of the arrestor bed is dependent upon the intended use, that is, the mass of the vehicle, its velocity and the compressive pressure of the vehicle's wheels on the foamed glass aggregate material. The aggregate material induces a drag force on the wheels of the vehicle by being unable to withstand the compressive force induced by the wheels such that they sink a distance into the aggregate material and thus squeeze a track/groove/rut in the aggregate mass when passing over the arrestor. Thus the functionality of the arrestor is tied to the compressive strength of the foamed glass aggregate, which is a function of the nominal void fraction of the foamed glass, the length of the arrestor zone, and the depth of the bed filled with foamed glass aggregate.

In principle, the invention may function with foamed glass with any known nominal void fraction, but in practice there will be a limit decided by the ground pressure induced by the wheels of the vehicles that are to be arrested. The wheels should be able to sink a distance into the aggregate mass in order to receive an effective drag force. And vice versa, the wheels should not penetrate too deep since this will result in a too high drag force and deceleration rates which may be harmful to the vehicle or persons onboard. It is thus believed that in practice, the nominal void fraction of the foamed glass being employed in the aggregate may vary from a relatively low aeration with nominal void fraction of 70% to highly aerated glasses with nominal void fraction of 98%. Any nominal void fraction in-between these two values may be employed, and there may also be employed any mixture of foamed glass aggregates with different nominal void fractions within these limits. It may also be envisioned to employ foamed glass with nominal void fractions outside this range.

Investigations of the foamed glass aggregate for use in arrestor systems intended to arrest aircrafts performed by Matthew Barsotti et al. [1] found that foamed glass aggregate with a density of 154 kg/m$^3$, corresponding to a nominal void fraction of 93.8% and with a graduation, that is, particle sizes of the aggregate in the range from 0.4-6.3 cm (0.2-2.4 inches), and with an average sized particle of the aggregate of 4.8 cm (1.9 inches) is well suited for use in multi-purpose aircraft arresting systems. The particle size distribution of the aggregate is 0.88 weight % of particles with sizes from 4 to 8 mm, 0.29 weight % with sizes from 8 to 12.5 mm, 1.03 weight % with sizes from 12.5 to 14 mm, 1.91 weight % with sizes from 14 to 16 mm, 4.21 weight % with sizes from 16 to 20 mm, 33.45 weight % with sizes from 20 to 31.5 mm, 35.30 weight % with sizes from 31.5 to 40 mm, 15.13 weight % with sizes from 40 to 50 mm, 5.74 weight % with sizes from 50 to 63 mm, and 0.31 weight % with sizes above 63 mm. These tests were performed with the aim of defining an optimum multi-purpose aircraft arrestor able to arrest aircrafts ranging from the 50 passenger seat Bombardier CRJ-100/200 to the 500 passenger seat Boeing B747-400.

A graduation of i.e. 0.4-6.3 cm as used herein is related to the mesh size of i.e. grates being used to classify the particles, such that the graduation of 0.4-6.3 cm means particles of foamed glass with sizes large enough to not pass through a grate with mesh size 0.4 cm but small enough to pass through a grate with mesh size of 6.3 cm.

The tests performed by Barsotti et al. also show that the foamed glass aggregate has an advantageous property in that the absorption of mechanical energy of the foamed glass aggregate material increases exponentially with compressive strain. This discovery was unexpected since each piece of foamed glass of the aggregate is composed of crushable glass, and is mechanically expected to exhibit similar properties as conventional crushable materials employed in present vehicle arrestors of the foam block type such as disclosed in U.S. Pat. No. 6,726,400 above. Without being bound by theory, it is believed that the foamed glass aggregate also will exhibit mechanical properties of a continuum since loose-fitting pieces of the aggregate will flow more or less freely when being exposed to the shear forces. The compression process for the aggregate foam consists of compressing the microstructural foam voids as well as the interstitial voids between aggregate pieces. This dual-mode compression may be the reason why the foamed glass aggregate is found to have an exponential increase in absorption of mechanical energy with increased compressive strain. This behaviour is seen from FIG. 1 which graphically shows the load history of compression tests performed on two gradations of the foamed glass aggregate.

The tests were performed by filling a confined cylinder with inner diameter 31.433 cm (12.375 inches) with foamed glass aggregate of one gradation, and pressing a platen of diameter 30.48 cm (12.00 inches) into the cylinder at a fixed rate of 7.62 cm/min (3 inches/min). The platen has a diameter which is at least 6 times the characteristic size of the aggregate particles to ensure continuum material behaviour. The material was loosely placed into the cylinder without packing.

As shown in the graph of FIG. 1, it is seen that the induced stress necessary to compress the material, and thus the energy absorbed by the material, increases exponentially with a linear increase in compression degree of the material. Further, it was found in the tests that the load data for replicate tests were remarkably consistent, despite the random nature of the aggregate pieces for each test. However, it was also found that the gradation size of the aggregate had a substantial effect on the loading and energy absorption. It is thus necessary to choose the gradation of the foamed glass aggregate carefully for use in arrestor beds. Another important observation from these tests is that the foamed glass aggregate material will function as a depth-varying compressible material where deeper wheel penetrations would lead to an increase in the vertical load, not only because a larger surface area comes into contact with the aggregate material, but also because the material continuously hardens as the compression increases. It is this property that makes the foamed glass aggregate suited for multi-purpose arrestor systems able to handle aircrafts of vastly different sizes, from small aircrafts with maximum take-off weights from about 24 metric tons of a 50 passenger jet-aircraft such as Bombardier CRJ-100 to about 590 metric tons of a 500 passenger aircraft such as Airbus A380.

Another use of the foamed glass aggregate arresting system is as safety-zones for passenger cars and/or buses/trucks travelling on public roads. The arresting system may be placed adjacent to the road in sharp curves, in steep hills etc. in order to arrest vehicles which has lost their road grip and is heading uncontrollably out off the road. Similar uses may also be to arrest bicycles which have lost control when travelling in cycle lanes. An adjacent arresting zone with modest arresting effect may provide the necessary braking assistance needed for the bicyclist to regain control. A further use of the arresting system is as a physical constraint for preventing wheeled attacks. Any area or building which needs protection against attacks carried on vehicles may be protected by forming arrestor zones around them which ensures that any vehicle trying to ram the area/building will be arrested. This use of the arresting system may be advantageous for i.e. UN bases in countries where there is risk of being attacked by trucks/cars loaded with explosives and a suicide driver. The arresting system may also be used in military installations where there is a need for physically preventing vehicles of entering the area. For these uses, it is envisioned employing foamed glass aggregates with high nominal void fractions and thus low compressive strengths to ensure that vehicles entering the arrestor area become firmly stuck.

As mentioned, the functionality of the invention is dependent on the nominal void fraction of the foamed glass and the gradation of the particles. That is, the effect of the invention is obtained when the crushing strength of the foamed glass aggregate is tuned to the ground pressure of the wheels of the vehicle being arrested. Tests have been performed on foamed glass particles with gradation 0.4 to 6.3 cm, mean particle size of 4.8 cm, and nominal void fraction of 86%, and calculations based on these tests show that this aggregate is suitable for use as multi-purpose arrestor for aircraft when the dimensions of the arresting bed is a length of 200 m and a depth of 90 cm. For other applications, it may be necessary to employ other gradations and/or nominal void fractions to take into account different restrictions related to allowed dimensions and/or other vehicles which are to be arrested. These gradations and/or nominal void fractions will be found by the skilled person by performing ordinary trial-and-error investigations.

The wide range of possible uses of the arresting system requires use of foamed glass aggregates with a wide range of nominal void fractions and gradations. The present invention should be understood as a general exploitation of a novel arresting material. It is the exploitation of the discovery of the exponential increase of the energy absorption by compression rates combined with the very low environmental impact and low cost of aerated glass that is the essence of this invention. Thus the invention encompasses any possible use of this material as arrestor for vehicles. In practice, the nominal void fractions would be somewhere from 70 to 98%, and the gradation would be somewhere from 0.25 cm to 15 cm. Any nominal void fraction and gradation within these limits may be employed. That is, the foamed glass aggregate may have a gradation with particle sizes of any range beginning with one of 0.25, 0.30, 0.40, 0.50, 0.60, 0.70, 0.80, 0.90, 1.00, 1.1, 1.2, 1.3, 1.4, 1.5, 1.6, 1.7, 1.8, 1.9, 2.0, 2.2, 2.4, 2.6, 2.8, 3.0, 3.5, 4.0, 4.5, and 5.0 cm, and ending with one of 5.5, 6.0, 6.5, 7.0, 8.5, 9.0, 9.5, 10, 11, 12, 13, 14, and 15 cm. Preferred ranges are gradation from 0.25 to 10 cm; from 0.5 to 8 cm; from 0.7 to 7 cm; and from 1 to 6 cm.

The foamed glass aggregate may also employ foamed glass particles with differences in nominal void fractions. That is, it is in addition to having aggregate masses with one nominal void fraction of the foamed glass particles, also envisioned to alternatively employ aggregate masses with mixtures of nominal void fractions in ranges beginning with one of 75, 76, 77, 78, 79, 80, 81, 82, 83, 84, 85, 86, 87, 88, 89, 90, 91, 92, 93, and 94% and ending with one of 76, 77, 78, 79, 80, 81, 82, 83, 84, 85, 86, 87, 88, 89, 90, 91, 92, 93, 94, and 95%. Preferred ranges are nominal void fractions from 80 to 98%; from 70 to 95%; and from 90 to 94%.

The foamed glass particles have a closed-cell microstructure which limits water absorption, such that water only may penetrate the outer-most open pores of the particles. The foamed glass aggregate has been used in civil engineering applications such as light fill construction, insulation and frost protection of road foundations and terraces. These applications show that the mechanical properties of the foamed glass aggregate are stable with cyclical variations of temperature and humidity. However, standing water which immerses the foamed glass particles may be a problem in climates with freeze and thaw cycles, since the outer most-open water filled pores may encounter frost erosion. This may lead to a lowering of the gradation of the aggregate material over time. Tests performed on the material have found that after 50 freeze-thawing cycles in full water immersion, the material obtained a 47% decrease in the energy absorption capacity.

It may therefore be advantageous to equip the aggregate bed with drainage means to prevent standing water in the aggregate mass. The drainage means may be any presently known or future civil engineering design able to drain a bed. Alternatively, the foamed glass aggregate mass in the arrestor bed may be made water-proof by being enveloped by geoplastic and/or geo-textile materials to form a sealing against water penetration. This technique is well known to persons skilled in the art of landfills.

The dimensions of the arrestor basin are not critical features of this invention and will be designed on a per-arrestor basis depending upon the type of aircraft or other vehicle to be serviced. Any conceivable size and design of the arrestor basin will fall within the scope of the invention. In practice, the dimensions of the arrestor basin will have depths ranging from about 10 cm to 200 cm and lengths from 1 m to 400 m. The design of the basin may be any geometric form suitable for the actual application. Examples of possible configurations of the design of the basin includes, but are not limited to, triangular, rectangular, circular, elliptical, polygonal, trapezoidal, or any combination of these.

The arrestor bed may advantageously be equipped with transition zones at the peripheral parts adjacent to the surrounding terrain/ground. The functionality of the transition zones is to provide a gradual increase in the drag load on the vehicle being arrested when entering the arrestor, by having a gradual increase of the depth of the bed when travelling from the edge towards the bulk part. The transition zone may be formed by having a stepped increase in the bed, or by having inclined walls of the bed.

LIST OF FIGURES

FIG. 1 is a facsimile of FIG. 11-8 of [1], showing measured compression stresses and energy absorption for the foamed glass aggregate with gradation 0.4-6.3 cm, mean particle size 4.8 cm and 93.8% nominal void fraction.

EXAMPLE EMBODIMENTS OF THE INVENTION

The invention will be described in further detail by way of two example embodiments intended for use as aircraft arresting systems. These embodiments should not be considered as a limitation of the general inventive idea of employing foamed glass aggregates for arresting vehicles of any kind.

First Example Embodiment

Figure 1:
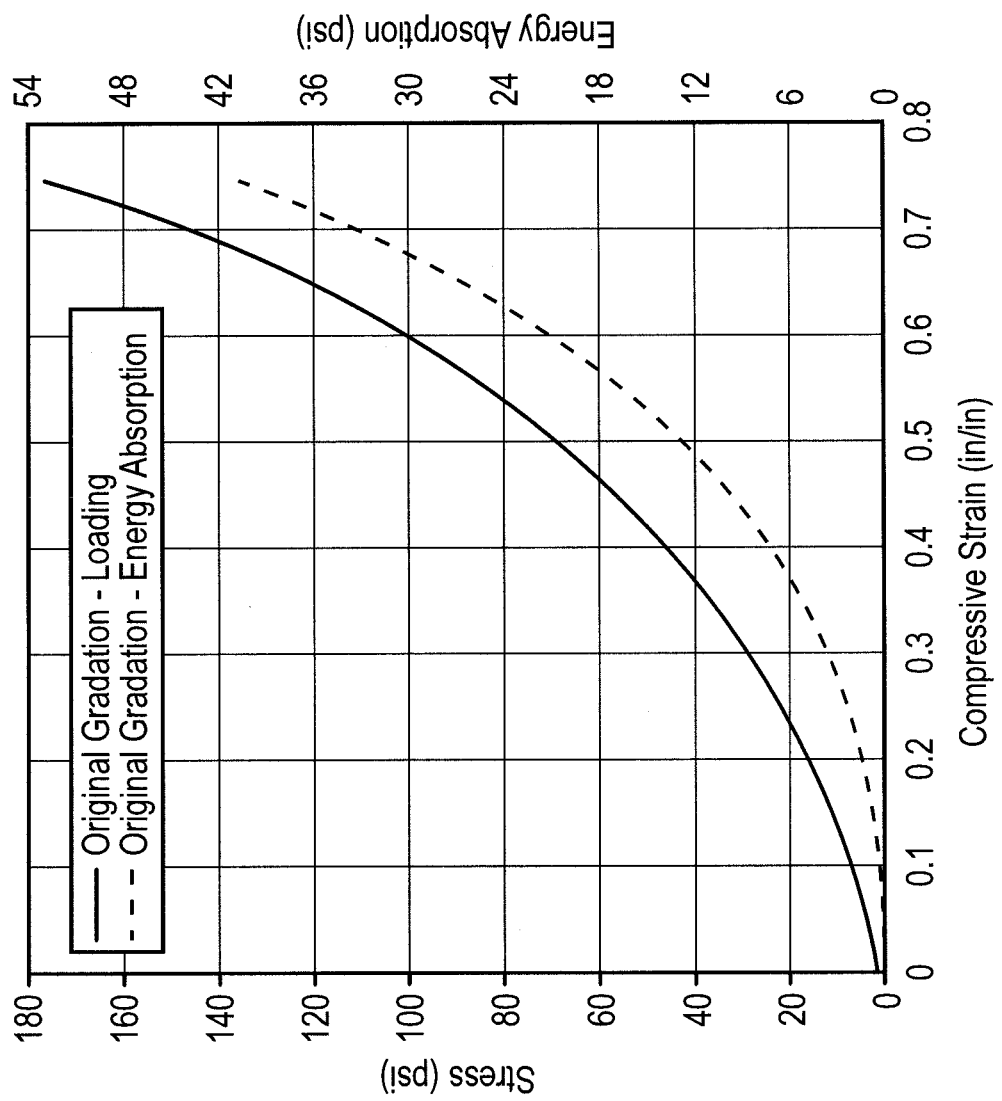
Figure 2:
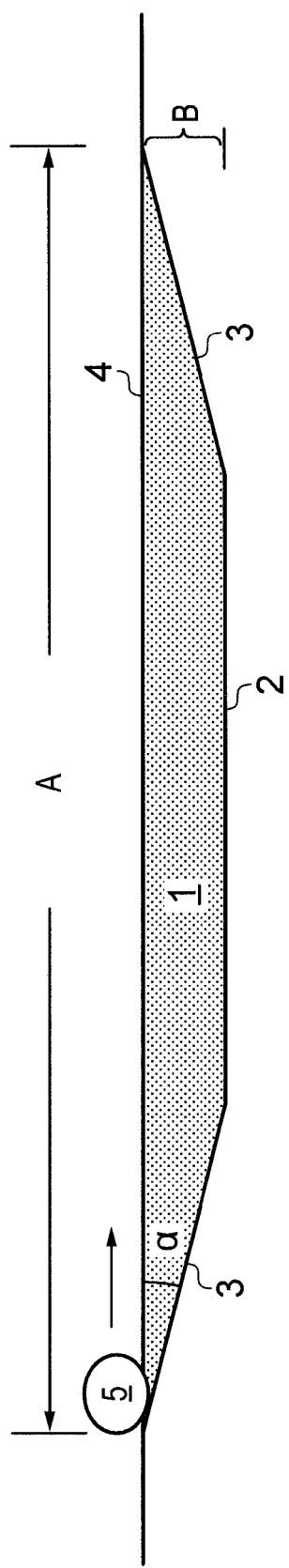
FIG. 2 is a schematic drawing of one example embodiment of the invention seen from the side.

A first example embodiment of the vehicle arresting system is formed into the ground, and is schematically shown from the side in FIG. 2. The longitudinal vertical cross section of the bed is given the shape of a trapezoid of altitude B and length A which is laid down into the ground 2 such that the upper surface 4 of the arresting zone is aligned with and at the same level as the plane formed by the surrounding ground 2. By use of a design with a vertical trapezoidal cross section of the bed, it is obtained that both ends of the bed is provided with smooth transition zones 3. The angle α of the inclination may typically be in the range from 20 to 30°. The bottom 2 of the bed may be provided with drainage means (not shown) for avoiding standing water in the bed.

The bed is filled with foamed glass aggregate 1. The maximum depth of the foamed glass aggregate in this embodiment is the altitude B of the trapezoid, and the length of the arresting zone is the length A of the upper side of the trapezoid. The top surface of the aggregate bed is covered with a cover layer 4 of artificial turf. A wheel 5 of an aircraft entering the arresting system is schematically shown. The wheel travels in the direction shown by the arrow, and will penetrate through the top cover 4 and sink gradually into the foamed glass as it passes over the smooth transition zone 2 and enters the bulk part of the bed.

The foamed glass aggregate has a nominal void fraction of 93.8% and the particles of the aggregate 1 has aggregation of 0.4-6.3 cm and mean particle size of 4.8 cm. The particle size distribution of the aggregate 1 is 0.88 weight % of particles with sizes from 4 to 8 mm, 0.29 weight % with sizes from 8 to 12.5 mm, 1.03 weight % with sizes from 12.5 to 14 mm, 1.91 weight % with sizes from 14 to 16 mm, 4.21 weight % with sizes from 16 to 20 mm, 33.45 weight % with sizes from 20 to 31.5 mm, 35.30 weight % with sizes from 31.5 to 40 mm, 15.13 weight % with sizes from 40 to 50 mm, 5.74 weight % with sizes from 50 to 63 mm, and 0.31 weight % with sizes above 63 mm. The size distribution is shown graphically in FIG. 4. The depth B of the bed is 91 cm, and the length A of the arresting zone is 200 m. The horizontal cross section of the bed (not shown) is either rectangular or triangular. In case of a rectangular cross section, the width of the bed is constant and should at least be as wide as the runway where the arrestor is placed, but may advantageously be wider in order to allow some course deviation of the aircraft when entering the arrestor bed. The ability to capture aircrafts with course deviations when entering the arrestor bed may be enhanced by forming the arrestor bed with a triangular horizontal cross section.

Figure 4:
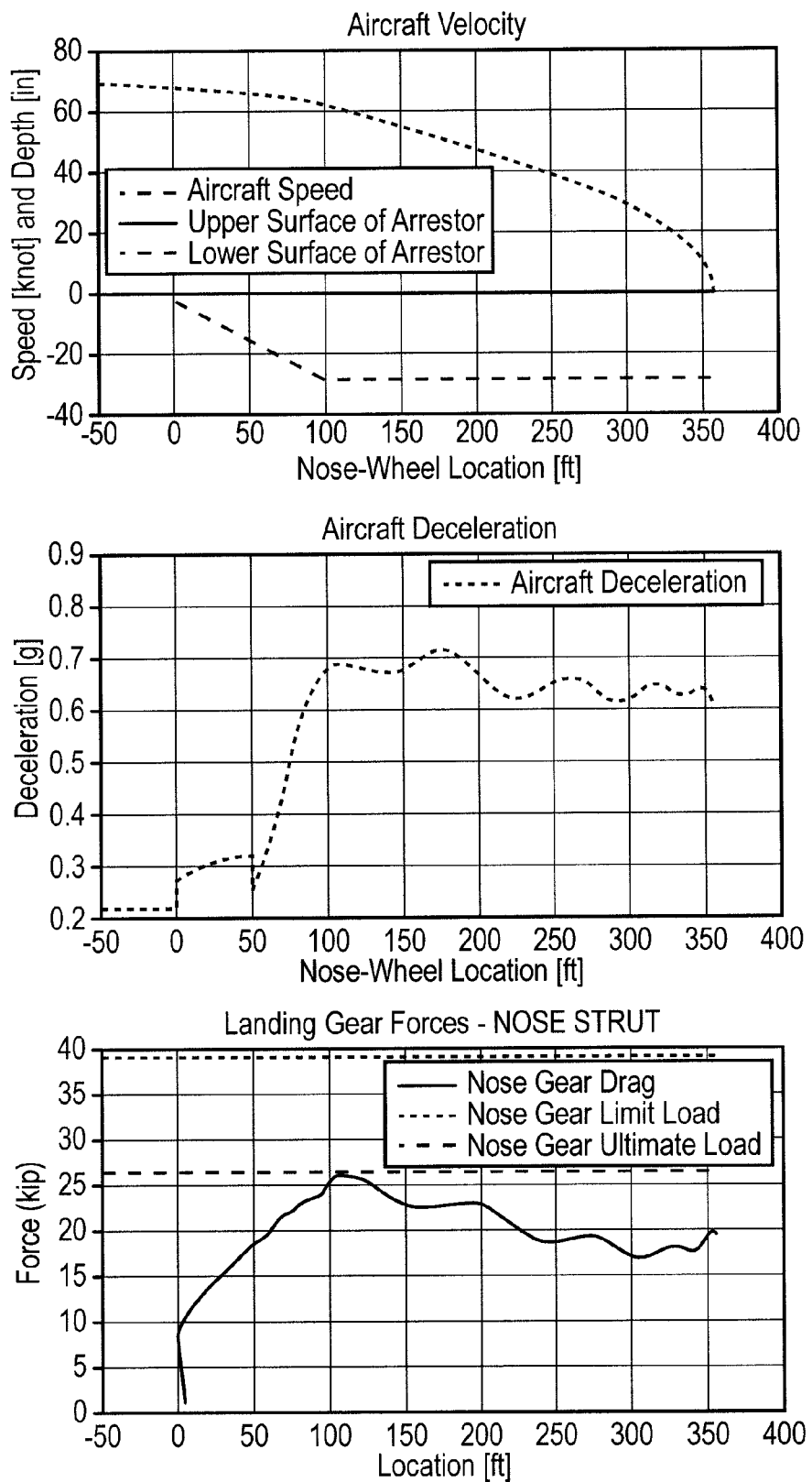
FIG. 4 is a facsimile of FIG. 11-22 of [1], showing calculated aircraft velocity, deceleration, and nose strut landing gear forces.
Figure 5:
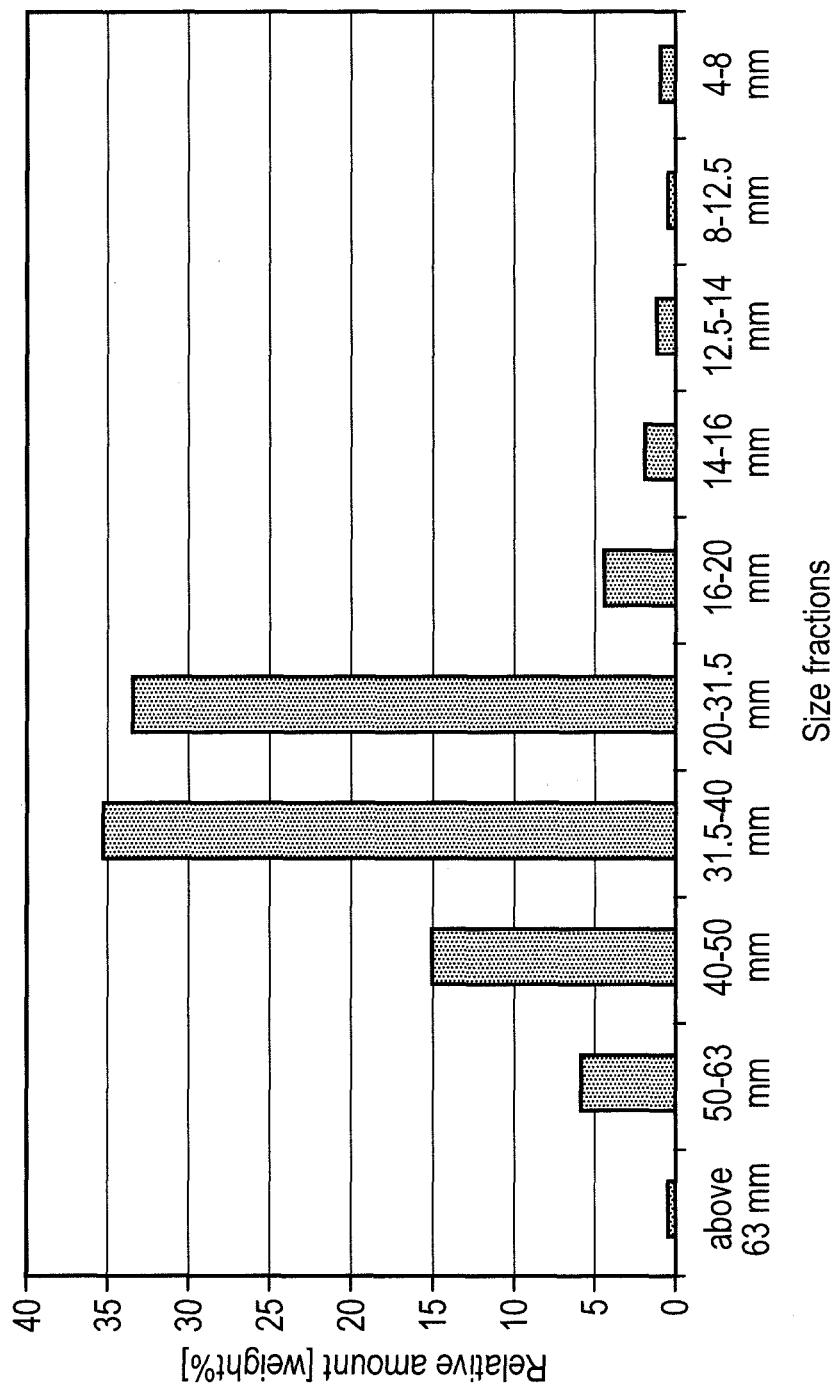
FIG. 5 is a bar diagram showing the particle size distribution of a foamed glass aggregate according to one example embodiment of the invention.
Figure 6:
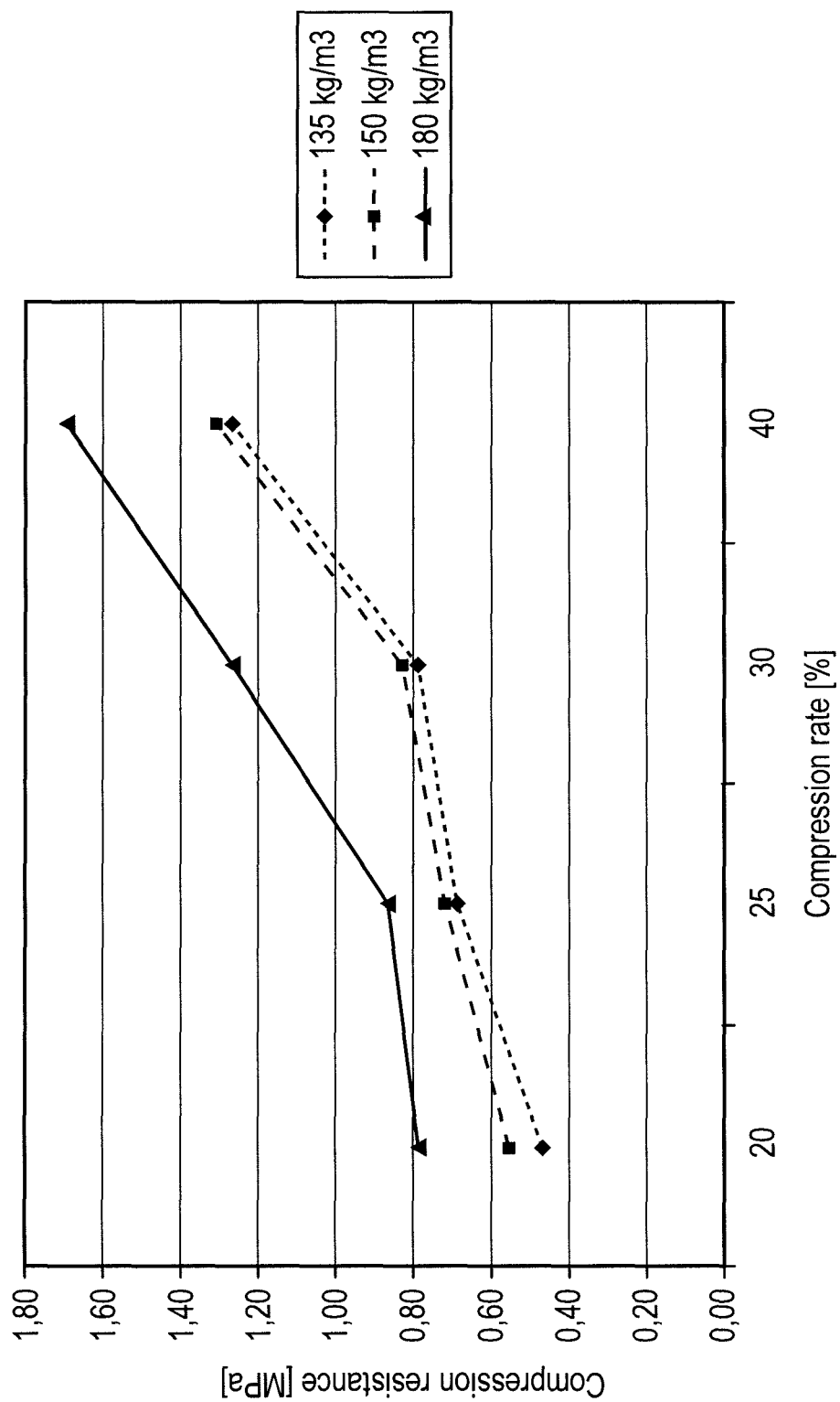
FIG. 6 shows a graphic representation of compression tests on aggregate of three nominal void fraction, each with the particle size distribution as shown in FIG. 4

The inventor has performed measurements of the crushing resistance of the aggregate 1 by pressing a circular piston with diameter of 29.99 cm into a barrel filled with the aggregate and which has internal diameter of 30.00 cm. The experiments have been made for the same gradation as aggregate 1 but with three different nominal void fractions. The results are given in Table 1 and shown graphically in FIG. 5. All three aggregates had the aggregation given above, and which is shown in FIG. 4.

Calculations performed by [1] have predicted that the example embodiment of the invention will be able to arrest aircrafts entering with a velocity of 130 km/h (70 knots) to full stop in 110 m (360 feet) when the aircraft is a Bombardier CRJ-200, 95 m (310 feet) in the case of Boeing 737-800, and 180 m (590 feet) in the case of a Boeing 747-400. A facsimile of FIG. 11-22 of [1] shows calculated aircraft velocity, deceleration, and nose strut landing gear forces induced by the foamed glass aggregate on a Boeing 737-800 entering the example embodiment with a velocity of 130 km/h.

Calculations provided in [1] for the Bombardier CRJ-200 and Boeing 747-400 shows similar results and verifies that the foamed glass aggregate of the example embodiment will provide a multi-purpose aircraft arresting system where the aircrafts are being arrested in a safe manner with deceleration rates of 0.7-1.0 g and stopping lengths in the range of 90 to 200 m.

Second Example Embodiment

The second example embodiment is made along the same principle solution as the first example embodiment, in that the arrestor is made of the same foamed glass aggregate with similar nominal void fraction and particle size distribution as given for the first example embodiment, and is given approximately the same length A and depth B of the bed. The example embodiment is shown from the side in FIG. 3. Please note that the length of the bed is truncated in the figure.

Figure 3:
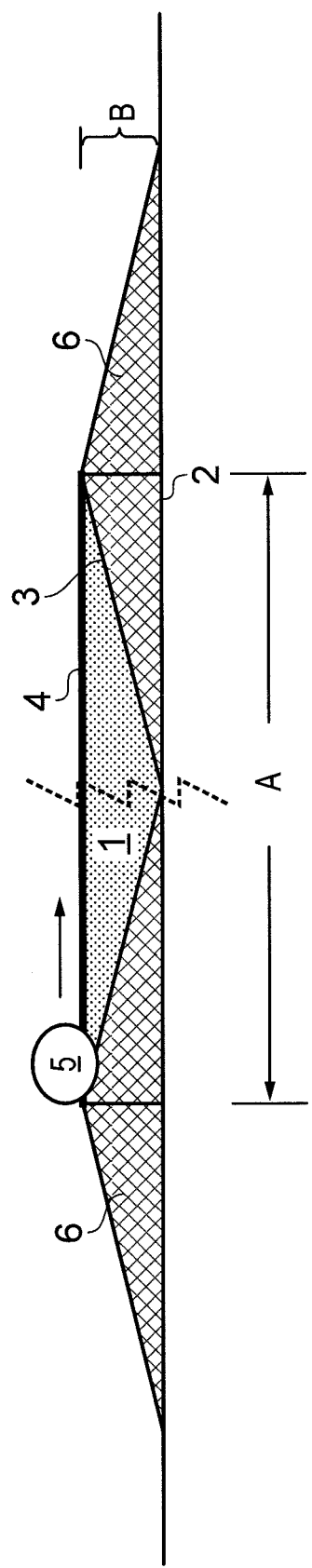
FIG. 3 is a schematic drawing of another example embodiment of the invention seen from the side.

The main difference is that the bed 1 of foamed glass aggregate in the second example embodiment is laid directly on the ground 2 without forming a pit/depression, see FIG. 3. In this case the bed of foamed glass needs to be contained by use of a mechanical structure 6 along the periphery of the bed. The mechanical structure should advantageously be designed to function as a ramp for both entering and exiting the aggregate bed 1. This may be obtained by forming the mechanical structure 6 with a triangular cross section such that an aircraft heading towards the bed 1 will run smoothly uphill onto the ramp and enter the bed 1 by sinking into the bed by rolling along the sloped inclined inner bottom 3 of the bed until the wheel 5 becomes suspended in the foamed glass aggregate. The inclination angle may be the same as given in the first example embodiment, but other inclination angles may also be employed. The bed is covered by a layer of artificial turf 4.

TABLE 1

Compression tests on aggregate of three nominal void fraction, each with the particle size distribution as shown in FIG. 4.

| Compression rate [%] | Compression force [N] | Compression resistance [MPa] |
|---|---|---|
| Aggregate with nominal void fraction of 94.6% (corresponds to a density of 135 kg/m$^3$) | | |
| 20 | 32 500 | 0.46 |
| 25 | 48 000 | 0.68 |
| 30 | 55 000 | 0.78 |
| 40 | 90 000 | 1.28 |
| Aggregate with nominal void fraction of 94.0% (corresponds to a density of 150 kg/m$^3$) | | |
| 20 | 38 000 | 0.54 |
| 25 | 50 000 | 0.71 |
| 30 | 58 000 | 0.82 |
| 40 | 92 000 | 1.30 |
| Aggregate with nominal void fraction of 92.8% (corresponds to a density of 180 kg/m$^3$) | | |
| 20 | 55 000 | 0.78 |
| 25 | 61 000 | 0.86 |
| 30 | 90 000 | 1.28 |
| 40 | 120 000 | 1.70 |

REFERENCES

1. Matthew Barsotti et al., report published on 21 Jan. 2010 with title "Developing Improved Civil Aircraft Arresting Systems", in the Airports Cooperative Research Program, administrated by the Transportation Research Board of the National Academies, USA.

The invention claimed is:

1. A vehicle arresting system, wherein the system comprises:
    a vehicle arresting area comprising a bed filled with foamed glass aggregate with particle sizes ranging from 0.25 cm to 15 cm and nominal void fractions from about 70 to 98%, and
    a top cover covering the upper surface of the bed of foamed glass aggregate.

2. The vehicle arresting system according to claim 1, wherein the foamed glass aggregate is made of soda-lime glass or soda-glass, with nominal void fraction in a range beginning with a percentage selected from a group consisting of 75, 76, 77, 78, 79, 80, 81, 82, 83, 84, 85, 86, 87, 88, 89, 90, 91, 92, 93, and 94% and ending with a percentage selected from a group consisting of 76, 77, 78, 79, 80, 81, 82, 83, 84, 85, 86, 87, 88, 89, 90, 91, 92, 93, 94, and 95%.

3. The vehicle arresting system according to claim 2, wherein the nominal void fraction is in one of the following ranges: from 80% to 90%; from 83% to 88%; and from 85% to 87%.

4. The vehicle arresting system according to claim 2, wherein the foamed glass aggregate have a gradation with particle sizes of any range beginning with one selected from a group consisting of 0.25, 0.30, 0.40, 0.50, 0.60, 0.70, 0.80, 0.90, 1.00, 1.1, 1.2, 1.3, 1.4, 1.5, 1.6, 1.7, 1.8, 1.9, 2.0, 2.2, 2.4, 2.6, 2.8, 3.0, 3.5, 4.0, 4.5, and 5.0 cm, and ending with one selected from a group consisting of 5.5, 6.0, 6.5, 7.0, 8.5, 9.0, 9.5, 10, 11, 12, 13, 14, and 15 cm.

5. The vehicle arresting system according to claim 4, wherein the foamed glass aggregate have a gradation of one of the following ranges: from 0.25 to 10 cm; from 0.5 to 8 cm; from 0.7 to 7 cm; and from 1 to 6 cm.

6. The vehicle arresting system according to claim 1, wherein the foamed glass aggregate has a nominal void fraction of 93.8% and the particles of the aggregate has aggregation of 0.4-6.3 cm and mean particle size of 4.8 cm, and that the depth of the bed is 91 cm and the length of the bed is 200 m.

7. The vehicle arresting system according to claim 6, wherein the particle size distribution of the foamed glass aggregate is 0.88 weight % of particles with sizes from 4 to 8 mm, 0.29 weight % with sizes from 8 to 12.5 mm, 1.03 weight % with sizes from 12.5 to 14 mm, 1.91 weight % with sizes from 14 to 16 mm, 4.21 weight % with sizes from 16 to 20 mm, 33.45 weight % with sizes from 20 to 31.5 mm, 35.30 weight % with sizes from 31.5 to 40 mm, 15.13 weight % with sizes from 40 to 50 mm, 5.74 weight % with sizes from 50 to 63 mm, and 0.31 weight % with sizes above 63 mm.

8. The vehicle arresting system according to claim 4, wherein the top cover is made of one of: polymeric tarpaulins, plastic foils, and artificial turf.

9. The vehicle arresting system according to claim 3, wherein the foamed glass aggregate have a gradation with particle sizes of any range beginning with one selected from a group consisting of 0.25, 0.30, 0.40, 0.50, 0.60, 0.70, 0.80, 0.90, 1.00, 1.1, 1.2, 1.3, 1.4, 1.5, 1.6, 1.7, 1.8, 1.9, 2.0, 2.2, 2.4, 2.6, 2.8, 3.0, 3.5, 4.0, 4.5, and 5.0 cm, and ending with one selected from a group consisting of 5.5, 6.0, 6.5, 7.0, 8.5, 9.0, 9.5, 10, 11, 12, 13, 14, and 15 cm.

10. The vehicle arresting system according to claim 9, wherein the foamed glass aggregate have a gradation of one of the following ranges: from 0.25 to 10 cm; from 0.5 to 8 cm; from 0.7 to 7 cm; and from 1 to 6 cm.

11. The vehicle arresting system according to claim 9, wherein the top cover is made of one of: polymeric tarpaulins, plastic foils, and artificial turf.

12. A method for arresting vehicles, wherein the method comprises:
   making a bed in the ground where the vehicles are to be arrested,
   filling the bed with foamed glass aggregate with particle sizes ranging from 0.25 cm to 15 cm and nominal void fractions from about 70% to 98%, and
   covering the upper surface of the bed with a top cover.

13. The method for arresting vehicles according to claim 12, wherein
   the vehicle to be arrested is aircrafts,
   forming a bed at the end of a runway with depth of 91 cm and a length of 200 m,
   employing foamed glass aggregate with nominal void fraction of 93.8% and the particles of the aggregate has aggregation of 0.4-6.3 cm and mean particle size of 4.8 cm, and
   covering the foamed glass aggregate with an artificial turf as top cover.

* * * * *